(12) United States Patent
Yoshioka et al.

(10) Patent No.: US 7,284,977 B2
(45) Date of Patent: Oct. 23, 2007

(54) ALIGNING DEVICE FOR AN INJECTION NOZZLE

(75) Inventors: Mitsushi Yoshioka, Yamanashi (JP); Tatsuya Kawasaki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 321 days.

(21) Appl. No.: 10/973,263

(22) Filed: Oct. 27, 2004

(65) Prior Publication Data

US 2005/0089599 A1 Apr. 28, 2005

(30) Foreign Application Priority Data

Oct. 28, 2003 (JP) .............................. 2003/367154

(51) Int. Cl.
 *B29C 45/18* (2006.01)
(52) U.S. Cl. ...................................... 425/542
(58) Field of Classification Search ................. 425/542
 See application file for complete search history.

(56) References Cited

U.S. PATENT DOCUMENTS

| | | | |
|---|---|---|---|
| 2,983,957 A | 5/1961 | Tudela | |
| 3,600,755 A | 8/1971 | Cook et al. | |
| 3,963,401 A | 6/1976 | Latter | |
| 4,708,622 A | 11/1987 | Hehl | |
| 4,783,041 A | * | 11/1988 | Sakaida et al. ............. 425/190 |

FOREIGN PATENT DOCUMENTS

| | | |
|---|---|---|
| GB | 1335567 | 10/1973 |
| JP | 3-124413 | 5/1991 |
| JP | 5-58244 | 8/1993 |
| JP | 5-329899 | 12/1993 |
| JP | 9-254201 | 9/1997 |
| JP | 10-202689 | 8/1998 |
| JP | 10-305359 | 11/1998 |
| JP | 11-342523 | 12/1999 |
| JP | 2002-120055 | 4/2002 |

OTHER PUBLICATIONS

European Search Report and Annex dated Feb. 15, 2005.
Notification of Grounds for Rejection dated Nov. 1, 2005.
English Language Abstract of JP 63-017016, published Jan. 25, 1988.

* cited by examiner

*Primary Examiner*—Tim Heitbrink
(74) *Attorney, Agent, or Firm*—Staas & Halsey LLP

(57) ABSTRACT

An aligning device whereby an injection nozzle can be easily aligned with the sprue of a mold. A stationary platen has a locating hole formed therein and a tapered portion continuous with the locating hole and tapered in a direction such that the tapered portion broadens toward the injection nozzle side. An aligning jig to be fitted into the locating hole and the tapered portion is prepared. The jig has a recess formed in the center of an end face thereof and having a shape matching that of the distal end of the injection nozzle. The jig is fitted into the locating hole, and the injection nozzle is engaged with the recess to align the injection nozzle with the axis of the locating hole. Since the mold is attached to the stationary platen such that the axis of the sprue of the mold is aligned with that of the locating hole, the injection nozzle becomes aligned with the sprue. The injection nozzle can be easily and accurately aligned even while the mold is attached to the stationary platen and also the mold and the injection cylinder are heated to high temperature.

2 Claims, 3 Drawing Sheets

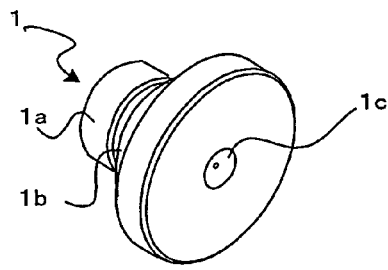
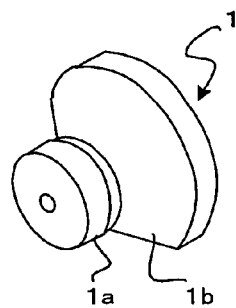
FIG.1a  FIG.1b
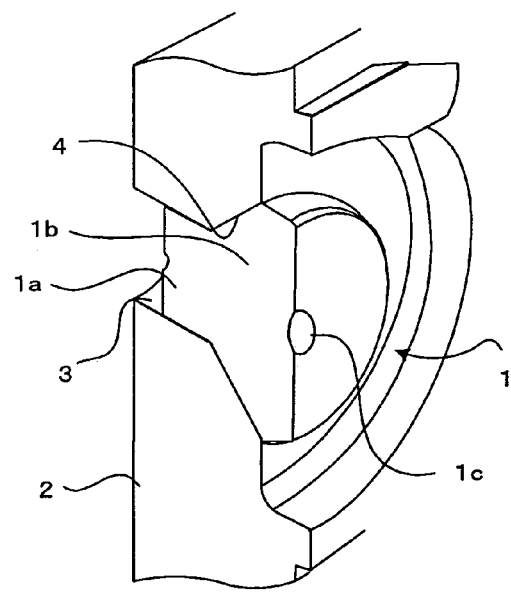
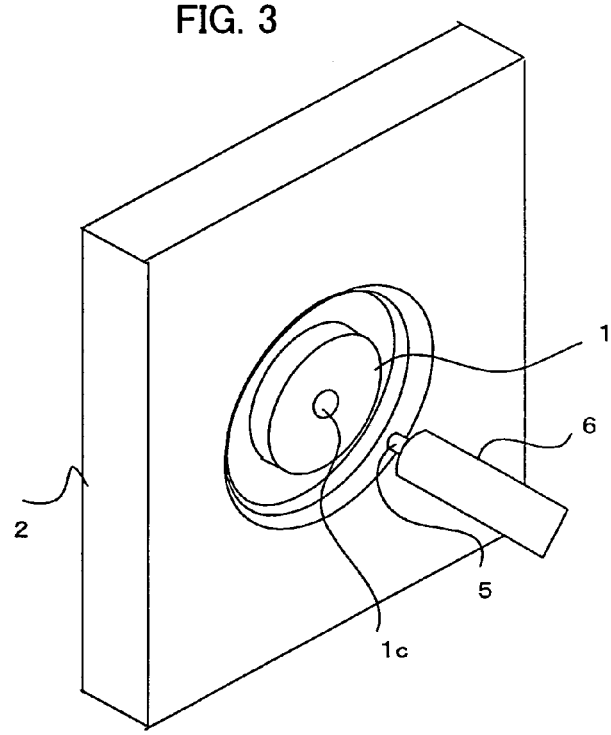
FIG. 2  FIG. 3

ALIGNING DEVICE FOR AN INJECTION NOZZLE

BACKGROUND OF THE INVENTION

1. Field of the Invention

The present invention relates to an injection molding machine, and more particularly to an aligning device for aligning an axis of an injection nozzle with that of a sprue of a mold.

2. Description of Related Art

In an injection molding machine, a mold is closed by bringing a movable mold half attached to a movable platen into contact with a stationary mold half attached to a stationary platen, and molten resin in an injection cylinder is injected into the mold from an injection nozzle. It is therefore necessary that the axis of the sprue of the mold and the axis of the injection nozzle should be in alignment with each other.

Conventionally, as shown in FIG. 7, a peephole 20 extending obliquely with respect to the axis of the injection nozzle is formed through the stationary platen 2 in the vicinity of a locating hole so that the contact of the distal end of the injection nozzle with a sprue bushing of the mold can be viewed through the peephole. The positional relationship between the injection nozzle and the sprue bushing is observed through the peephole 20 to accurately bring the injection nozzle into alignment (see JP 05-329899A).

However, in the case of a mold whose sprue bushing is located inward of the mounting surface at which the mold is attached to the stationary platen (i.e., located closer to the interior of the mold), it is often impossible to observe the positional relationship between the injection nozzle and the sprue bushing.

Also, in a small-sized injection molding machine, a small-sized mold is used, and in order to obtain sufficient rigidity of the stationary platen and of the mold, a small locating hole is formed through the stationary platen. It is therefore difficult to form a peephole, as seen from FIG. 8, and even if a peephole is formed, the position of contact between the distal end of the injection nozzle 5 and the sprue bushing of the mold cannot be observed.

Accordingly, when aligning the injection nozzle 5, the stationary mold half is detached from the stationary platen 2, the injection nozzle 5 is inserted into the locating hole of the stationary platen, and the position of the injection nozzle 5 is adjusted from the side of the mold mounting surface of the stationary platen such that the distal end of the injection nozzle 5 inserted into the locating hole is located at the center of the locating hole.

There has also been known a method using an axis aligning jig for aligning the distal end of the nozzle with the sprue of the mold (see JP 03-124413A). This method uses an axis aligning jig which includes a protrusion to be fitted into the nozzle insertion hole of the stationary platen, a center shaft tiltable relative to an axial hole formed in the center of the protrusion, and a sensor for detecting the tilt of the center shaft. The alignment of the injection nozzle with the sprue of the mold is carried out in the manner described below. The jig is attached to the injection unit side of the stationary platen, and with the mold pulled up with a crane or the like, the mold is temporarily fixed to the stationary platen. Then, the injection unit is advanced to cause the distal end of the nozzle to fit in a concave surface of the center shaft of the jig, and the value detected and indicated by the sensor is read. Subsequently, the mold is closed while being pulled up with the crane etc., and with the center shaft of the jig fitted into the sprue of the mold, the position of the stationary mold half is adjusted using a hammer or the like so that the value detected by the sensor may become equal to the previously obtained reading of the sensor.

Meanwhile, when the injection molding machine is operated to perform injection molding, the mold and an injection cylinder are heated to high temperature. Because of rise in temperature, the mold and the injection cylinder thermally expand. Consequently, there arises a difference between the vertical position where the mold should be located when the stationary mold half is detached from the stationary platen and the vertical position where the stationary mold half is located when attached to the stationary platen and heated to high temperature. Thus, even in the case where the injection nozzle is aligned while the stationary mold half is detached from the stationary platen, a small deviation occurs between the position of the injection nozzle and the position of the sprue of the mold.

It is therefore desirable that the injection nozzle should be aligned while the mold and the injection cylinder are heated to high temperature. The aligning method using the jig, disclosed in the above patent document, is applied to the alignment carried out before the mold and the injection cylinder are heated to high temperature. Also, the jig used includes a sensor etc. Thus, the jig is complicated in structure and is expensive, and also the attachment/detachment thereof is not easy.

SUMMARY OF THE INVENTION

The present invention provides an aligning device capable of aligning an injection nozzle with a sprue of a mold with ease and low cost in a state where the mold is attached to a stationary platen and heated to a high temperature.

An aligning device of the present invention comprises: a stationary platen having a locating hole for locating the sprue of the mold and a tapered portion aligned with the locating hole and spreading toward the injection nozzle; and an aligning jig having a columnar portion and a frustum portion to be fitted to the locating hole and the tapered portion, respectively, of the stationary platen. The injection nozzle is brought into alignment with the sprue of the mold by adjusting a position of the injection nozzle such that a distal end of the injection nozzle coincides with a center of a bottom face of the conical portion of the aligning jig fitted to the stationary platen.

The aligning jig may have a recess formed to be matched with a shape of the distal end of the injection nozzle for engagement therewith at the center of the bottom face of the conical portion.

The aligning jig may have a through hole along an axis of the columnar portion and an elongated pin inserted into the through hole to project from the bottom face of the conical portion for alignment with the injection nozzle. The elongated pin may have a diameter smaller than a diameter of a nozzle hole of the injection nozzle so that the elongated pin is inserted into the nozzle hole of the injection nozzle.

Thus, the injection nozzle is brought into alignment with the sprue of the mold using the aligning jig of simple structure which is fitted to the stationary platen. Therefore, in a state where the mold is attached to the stationary platen and the mold and the injection cylinder are heated to a high temperature, the injection nozzle is brought into alignment with the sprue of the mold with ease and high accuracy.

BRIEF DESCRIPTION OF THE DRAWINGS

FIGS. 1a and 1b are perspective views each showing an aligning jig used in a first embodiment of the present invention;

FIG. 2 is a partly sectional enlarged view showing the aligning jig of the first embodiment fitted to a stationary platen;

FIG. 3 is a view illustrating how an injection nozzle is aligned by using the aligning jig of the first embodiment fitted to the stationary platen;

DETAILED DESCRIPTION

Figure 4:
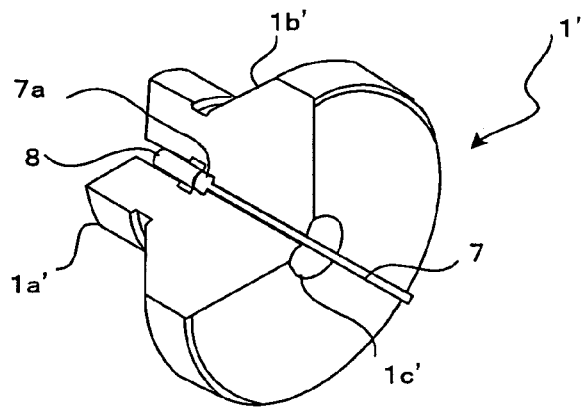
FIG. 4 is a partly sectional perspective view of an aligning jig used in a second embodiment of the present invention.

FIGS. 1a and 1b are perspective views each showing, from a different direction, an aligning jig constituting an injection nozzle aligning device according to one embodiment of the present invention. The aligning jig 1 has a columnar portion 1a and a conical portion 1b aligned with the axis of the columnar portion 1a and continuous with the columnar portion 1a. The conical portion 1b has a bottom surface (end face located opposite the columnar portion), and a recess 1c for engaging with the distal end of an injection nozzle is formed in the center (on the axis of the columnar and conical portions 1a and 1b) of the bottom surface. The recess 1c has a concave shape matching the shape of the distal end of the injection nozzle so as to come into close contact with the distal end and has a size slightly larger than that of the distal end of the injection nozzle.

On the other hand, a stationary platen 2, to which a stationary mold half is attached, has a fitting hole for receiving the aligning jig 1. FIG. 2 is an enlarged sectional view showing only a central part of the stationary platen 2. The stationary platen 2 has a locating hole 3 and a tapered portion 4 continuous with the locating hole 3 and having an axis aligned with that of the locating hole 3. The tapered portion 4 is tapered in a direction such that the tapered portion broadens toward an injection nozzle side. The aligning jig 1 is fitted at the columnar portion 1a into the locating hole 3 in such a manner that the conical portion 1b of the jig 1 is in close engagement with the tapered portion 4 of the stationary platen 2.

Namely, the diameters of the locating hole 3 and tapered portion 4 of the stationary platen 2 and the outside diameters of the columnar portion 1a and conical portion 1b of the aligning jig 1 have dimensions such that the columnar portion 1a and conical portion 1b of the aligning jig can be respectively fitted into the locating hole 3 and tapered portion 4 of the stationary platen 2.

FIG. 3 is a perspective view showing the aligning jig 1 fitted to the stationary platen 2. The aligning jig 1 is fitted into the locating hole 3 of the stationary platen 2, and since the recess 1c of the jig 1 is formed in the end face of the conical portion 1b such that the center thereof is aligned with the axis of the columnar portion 1a fitted into the locating hole 3, the center of the recess 1c of the aligning jig 1 is located on the axis of the locating hole 3. Accordingly, by causing the distal end of an injection nozzle 5 to fit into and contact with the recess 1c of the aligning jig 1, it is possible to position the injection nozzle 5 and the injection cylinder 6, and thus the injection unit, in alignment with the axis of the locating hole 3. Since the mold is attached to the stationary platen such that the axis of the sprue thereof is aligned with the locating hole 3, the injection nozzle becomes aligned with the sprue.

As shown in FIG. 3, the aligning jig 1 projects from the locating hole 3 toward the injection nozzle side. Accordingly, the position of the recess 1c of the aligning jig 1 can be observed with ease, facilitating the alignment of the injection nozzle 5 with the recess 1c of the aligning jig 1. Also, the aligning jig 1 is fitted to and removed from the stationary platen 2 from the injection nozzle side. It is therefore possible to carry out the alignment even while the mold is attached to the stationary platen 2 and at the same time the mold and the injection cylinder 6 are heated to high temperature.

Figure 5:
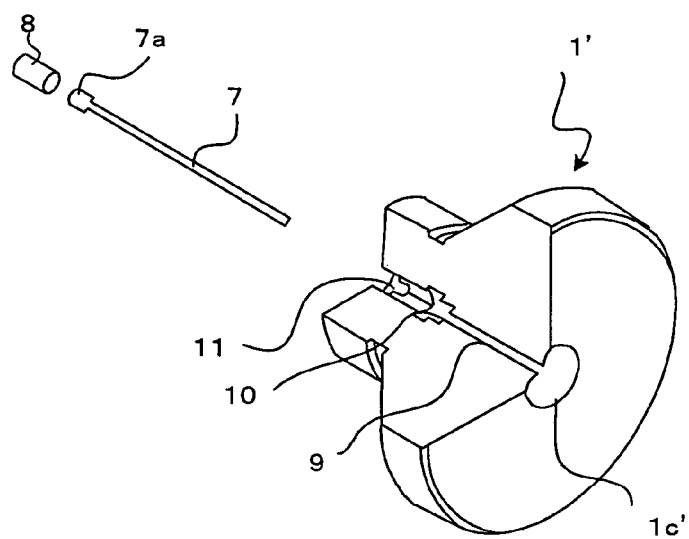
FIG. 5 is a view illustrating how the aligning jig of the second embodiment is assembled.

FIG. 4 is a partly sectional perspective view of an aligning jig 1' according to a second embodiment of the present invention, and FIG. 5 is a view illustrating how the aligning jig 1' is assembled. FIGS. 4 and 5 both show the aligning jig 1' of which a quarter is cut away. The aligning jig 1' has an external form identical with that of the aligning jig 1 of the first embodiment shown in FIG. 1. Specifically, the second embodiment is identical with the first embodiment in that the aligning jig has a columnar portion 1a', a conical portion 1b' and a recess 1c', and the difference resides in that a pin 7 is inserted in alignment with the axis of the aligning jig 1'.

The pin 7 has an outside diameter smaller than the diameter of the nozzle hole of the injection nozzle 5 and has a large-diameter portion 7a at a rear end thereof. Along the axis of the aligning jig 1' are formed a hole 9 through which the pin 7 is to be inserted, a large-diameter fixing hole 10 which communicates with the hole 9 and into which the large-diameter portion 7a of the pin 7 is to be fitted to fix the pin 7 in position, and a threaded hole 11 which communicates with the fixing hole 10 and which has a female thread cut therein. The hole 9, the fixing hole 10 and the threaded hole 11 are located in this order as viewed from the side of the bottom surface of the conical portion 1b' (from the injection nozzle side). As shown in FIG. 5, the pin 7 is inserted into the hole 9, and a setscrew 8 is screwed into the threaded hole 11 to fix the large-diameter portion 7a in the fixing hole 10, whereupon the assembly of the aligning jig 1' is completed.

Figure 6:
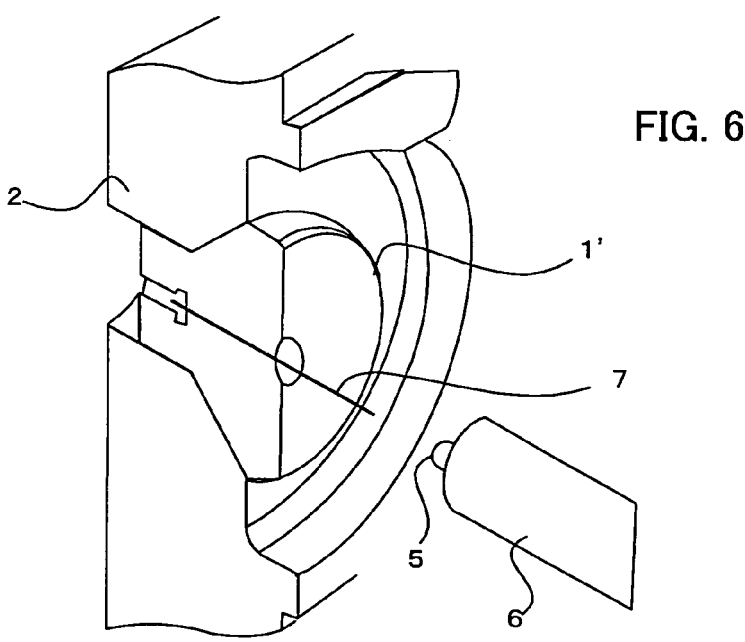
FIG. 6 is a view illustrating how the injection nozzle is aligned by using the aligning jig of the second embodiment fitted to the stationary platen.
Figure 7:
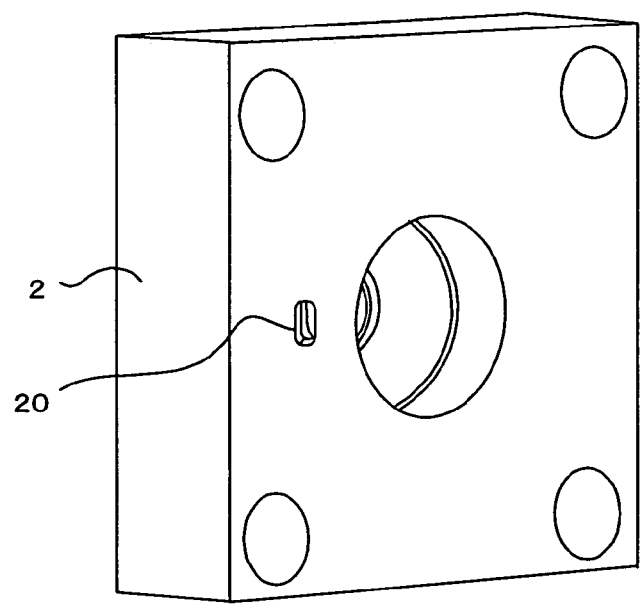
FIG. 7 is a perspective view of a conventional stationary platen having a peephole.
Figure 8:
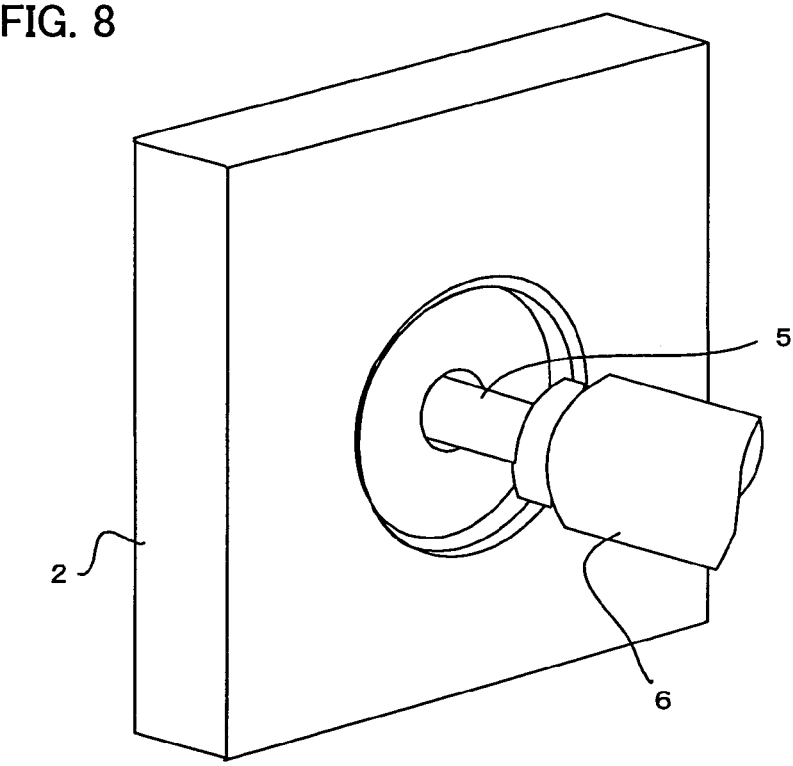
FIG. 8 is a view illustrating how an injection nozzle is aligned with respect to a stationary platen of a small-sized injection molding machine.

The aligning jig 1' is fitted into the fitting hole of the stationary platen 2, as in the first embodiment. Since the axis of the aligning jig 1' is in alignment with the axis of the locating hole 3, the pin 7 projects from the bottom surface of the conical portion of the jig 1' in alignment with the axis of the locating hole 3. The injection nozzle 5 (injection cylinder, injection unit) is positioned so that the pin 7 can be inserted into the nozzle hole of the injection nozzle 5, as shown in FIG. 6, and then the pin 7 is inserted into the nozzle hole of the injection nozzle 5, whereupon the alignment of the injection nozzle is completed. In this embodiment, the injection nozzle 5 is aligned by inserting the pin 7 into the nozzle hole of the injection nozzle and thus can be aligned with accuracy. Also in this embodiment, the injection nozzle 5 can be easily aligned even while the mold is attached to the stationary platen 2 and also the mold and the injection cylinder 6 are heated to high temperature.

What is claimed is:

1. An aligning device for aligning an injection nozzle of an injection molding machine with a sprue of a mold, comprising:
   a stationary platen having a locating hole for locating the sprue of the mold and a tapered portion aligned with the locating hole and spreading toward the injection nozzle; and
   an aligning jig having a columnar portion and a frustum portion to be fitted to the locating hole and the tapered portion, respectively, of said stationary platen,
   wherein the injection nozzle is aligned with the sprue of the mold by adjusting a position of the injection nozzle such that a distal end of the injection nozzle coincides with a center of a bottom face of the frustum portion of said aligning jig fitted to said stationary platen,
   wherein said aligning jig has a through hole along an axis of the columnar portion and an elongated pin inserted into said through hole to project from the bottom face of the frustum portion for alignment with the injection nozzle.

2. An aligning device according to claim 1, wherein the elongated pin has a diameter smaller than a diameter of a nozzle head of the injection nozzle so that the elongated pin is inserted into the nozzle hole of the injection nozzle.

* * * * *